US012624738B2

(12) United States Patent
Schweisthal et al.

(10) Patent No.: US 12,624,738 B2
(45) Date of Patent: May 12, 2026

(54) METHODS OF MANUFACTURING GAS SPRING END MEMBER ASSEMBLIES AND GAS SPRING ASSEMBLIES INCLUDING SAME

(71) Applicant: Firestone Industrial Products Company, LLC, Nashville, TN (US)

(72) Inventors: Michael F. Schweisthal, Nashville, TN (US); Jan Van Aartsen, Arnhem (NL); Pawel Wojtkowiak, Velp (NL)

(73) Assignee: Firestone Industrial Products Company, LLC, Nashville, TN (US)

( * ) Notice: Subject to any disclaimer, the term of this patent is extended or adjusted under 35 U.S.C. 154(b) by 903 days.

(21) Appl. No.: 17/799,057

(22) PCT Filed: Feb. 11, 2021

(86) PCT No.: PCT/US2021/017541
§ 371 (c)(1),
(2) Date: Aug. 11, 2022

(87) PCT Pub. No.: WO2021/163248
PCT Pub. Date: Aug. 19, 2021

(65) Prior Publication Data
US 2023/0067895 A1 Mar. 2, 2023

Related U.S. Application Data

(60) Provisional application No. 62/972,967, filed on Feb. 11, 2020.

(51) Int. Cl.
*F16F 9/05* (2006.01)
*B29C 45/00* (2006.01)
(Continued)

(52) U.S. Cl.
CPC .......... *F16F 9/052* (2013.01); *B29C 45/0062* (2013.01); *B29L 2031/721* (2013.01);
(Continued)

(58) Field of Classification Search
None
See application file for complete search history.

(56) References Cited

U.S. PATENT DOCUMENTS

2018/0001526 A1* 1/2018 Bland ................. B29C 45/0062

FOREIGN PATENT DOCUMENTS

DE 102017216052 A1 5/2018
FR 2848496 A1 6/2004

OTHER PUBLICATIONS

FR-2848496-A: English Machine Translation (Year: 2004).*
(Continued)

*Primary Examiner* — Melanie Torres Williams

(57) ABSTRACT

An end member assembly is dimensioned for securement to an associated flexible spring member. End member assembly includes first, second and third end member sections. First end member section includes a first outer peripheral wall portion. Second end member section includes a second outer peripheral wall portion. Second end member section is positioned in abutting engagement with the first end member section such that a groove extends peripherally around first and second end member sections between first and second outer peripheral wall portions. Third end member section is injection molded in situ with first and second end member sections such that third end member section extends peripherally around first and second end member sections within groove. Gas spring assemblies and vehicle suspension systems are also included.

19 Claims, 14 Drawing Sheets

(51) Int. Cl.
  *B29L 31/00*       (2006.01)
  *B60G 11/27*       (2006.01)

(52) U.S. Cl.
  CPC ........ *B60G 11/27* (2013.01); *B60G 2202/152*
        (2013.01); *B60G 2206/424* (2013.01); *B60G*
        *2206/81012* (2013.01); *B60G 2800/162*
        (2013.01); *F16F 2222/126* (2013.01); *F16F*
        *2226/04* (2013.01); *F16F 2230/0005* (2013.01)

(56)            References Cited

OTHER PUBLICATIONS

International Search Report and Written Opinion dated May 26, 2021 issued by EPO in connection with corresponding International Application No. PCT/US2021/017541.

* cited by examiner

METHODS OF MANUFACTURING GAS SPRING END MEMBER ASSEMBLIES AND GAS SPRING ASSEMBLIES INCLUDING SAME

This application is the National Stage of International Application No. PCT/US2021/017541, filed on Feb. 11, 2021, which claims the benefit of priority from U.S. Provisional Patent Application No. 62/972,967, filed on Feb. 11, 2020, the entire contents of which is hereby incorporated herein by reference.

BACKGROUND

The subject matter of the present disclosure broadly relates to the art of gas spring devices and, more particularly, to end member assemblies for gas springs that include two polymeric wall portions with a third polymeric wall portion injection molded separately therefrom with the two polymeric wall portions in situ such that a substantially fluid-tight joint is formed by the third polymeric wall portion around, across and/or otherwise between the first and second polymeric wall portions. Gas spring assemblies including one or more of such end member assemblies are also included. In some cases, such gas spring assemblies can be assembled coextensively with a damper to form gas spring and damper assemblies. Additionally, vehicle suspension systems including one or more of such gas spring assemblies (and/or gas spring and damper assemblies) are included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring and damper assemblies of non-wheeled vehicles, support structures, height adjusting systems and actuators associated with industrial machinery, components thereof and/or other such equipment. Accordingly, the subject matter of the present disclosure is not intended to be limited to use associated with suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

Generally, the plurality of spring devices function to accommodate forces and loads associated with the operation and use of the vehicle. The plurality of damping devices are operative to dissipate energy associated with undesired inputs and movements of the sprung mass, such as road inputs occurring under dynamic operation of a vehicle, for example. In many cases, the damping devices can be liquid-filled, hydraulic dampers of a known construction (e.g., a conventional shock absorber or strut). In other cases, however, the damping devices can be of a type and kind that utilize gaseous fluid rather than liquid as the working medium.

In many applications involving vehicle suspension systems, it may be desirable to utilize spring elements that have as low of a spring rate as is practical, as the use of lower spring rate elements can provide improved ride quality and comfort compared to spring elements having higher spring rates. That is, it is well understood in the art that the use of spring elements having higher spring rates (i.e., stiffer springs) will transmit a greater magnitude of road inputs into the sprung mass of the vehicle and that this typically results in a rougher, less-comfortable ride. Whereas, the use of spring elements having lower spring rates (i.e., softer, more-compliant springs) will transmit a lesser amount of road inputs into the sprung mass and will, thus, provide a more comfortable ride.

In some cases, the spring devices of vehicle suspension systems will include springs that utilize pressurized gas as the working medium of the devices. Generally, it is possible to reduce the spring rate of gas springs, thereby improving ride comfort, by increasing the volume of pressurized gas operatively associated with the gas spring. This is commonly done by utilizing an end member that defines an additional chamber, cavity or volume filled with pressurized gas in fluid communication with the primary spring chamber of the gas spring. However, end members of this type can be challenging to manufacture as a single unitary component. Thus, in many cases, such end members are assembled from multiple components that are secured together such that a substantially fluid-tight joint is formed therebetween.

Unfortunately, many assembly techniques that are currently used to manufacture such multi-component end members suffer from elevated manufacturing costs, such as may be due to the inclusion and installation of seals and/or the manipulation and handling of components during the joining process. Additionally, in some cases, generating and maintaining robust and substantially fluid-tight joints between components can be challenging and can sometimes lead to undesirable pressurized gas loss or other decreases in performance characteristics of the resulting assembly. Accordingly, it is believed desirable to develop constructions that may aid in overcoming the foregoing and/or other disadvantages of known end member assemblies, and/or otherwise advance the art of vehicle suspension systems and/or components thereof.

BRIEF DESCRIPTION

One example of an end member assembly in accordance with the subject matter of the present disclosure can have a longitudinal axis and can be dimensioned for securement to an associated flexible spring member. The end member assembly can include a first end member section with a first section wall that includes a first outer peripheral wall portion and a second end member section with a second section wall that includes a second outer peripheral wall portion. The second end member section can be positioned in abutting engagement with the first end member section such that a groove extends peripherally around the first and second end member sections between the first and second outer peripheral wall portions. A third end member section with a third section wall can be injection molded in situ with the first and second end member sections such that the third end member section extends peripherally around the first and second end member sections within the groove.

One example of a gas spring assembly in accordance with the subject matter of the present disclosure can have a longitudinal axis and can include a flexible spring member extending peripherally about the longitudinal axis and longitudinally between opposing first and second ends such that a spring chamber is at least partially defined therebetween. A first end member assembly according to the foregoing paragraph can be operatively operatively secured across the first end of the flexible spring member such that a substantially fluid-tight connection is formed therebetween. A second end member assembly can be operatively secured across the second end of the flexible spring member such that a substantially fluid-tight connection is formed therebetween.

One example of a gas spring and damper assembly in accordance with the subject matter of the present disclosure can include a gas spring assembly according to the foregoing paragraph and a damper assembly with the gas spring assembly disposed in axially coextensive relation with at least a portion of the damper assembly.

One example of a suspension system in accordance with the subject matter of the present disclosure can include a pressurized gas system that includes a pressurized gas source and a control device. The suspension system can also include at least one gas spring and damper assembly according to the foregoing paragraph. The at least one gas spring and damper assembly can be disposed in fluid communication with the pressurized gas source through the control device such that pressurized gas can be selectively transferred into and out of the spring chamber.

One example of a method of manufacturing an end member assembly in accordance with the subject matter of the present disclosure can include injecting a first quantity of polymeric material into a first mold cavity that is at least partially defined by first and second first mold sections and thereby molding a first end member section. The method can also include injecting a second quantity of polymeric material into a second mold cavity at least partially defined by first and second second mold sections thereby molding a second end member section that is separate from the first end member section. The method can further include separating the first first mold section from the second first mold section thereby exposing a portion of the first end member section while the first end member section remains in situ in the second first mold section. The method can also include separating the first second mold section from the second second mold section thereby exposing a portion of the second end member section while the second end member section remains in situ in the second second mold section. The method can further include introducing the first end member section in situ in the second first mold section to the second end member section in situ in the second second mold section thereby forming a groove extending peripherally around the first and second end member sections. The method can also include injecting a third quantity of polymeric material in situ into the groove between the first and second end member sections thereby forming a third end member section operatively connecting the first and second end member sections such that a substantially fluid-tight joint is formed therebetween.

BRIEF DESCRIPTION OF THE DRAWINGS

FIG. 12 is an enlarged view of the portion of the end member components and mold sections identified in FIG. 11 as Detail 12.

FIG. 13 is an enlarged view of a cross-sectional profile of an exemplary cavity for in situ manufacture of the third end member component.

DETAILED DESCRIPTION

Turning now to the drawings, it is to be understood that the showings are for purposes of illustrating examples of the subject matter of the present disclosure and that such examples are not intended to be limiting. Additionally, it will be appreciated that the drawings are not to scale and that portions of certain features and/or components may be exaggerated for purposes of clarity and/or ease of understanding.

Figure 1:
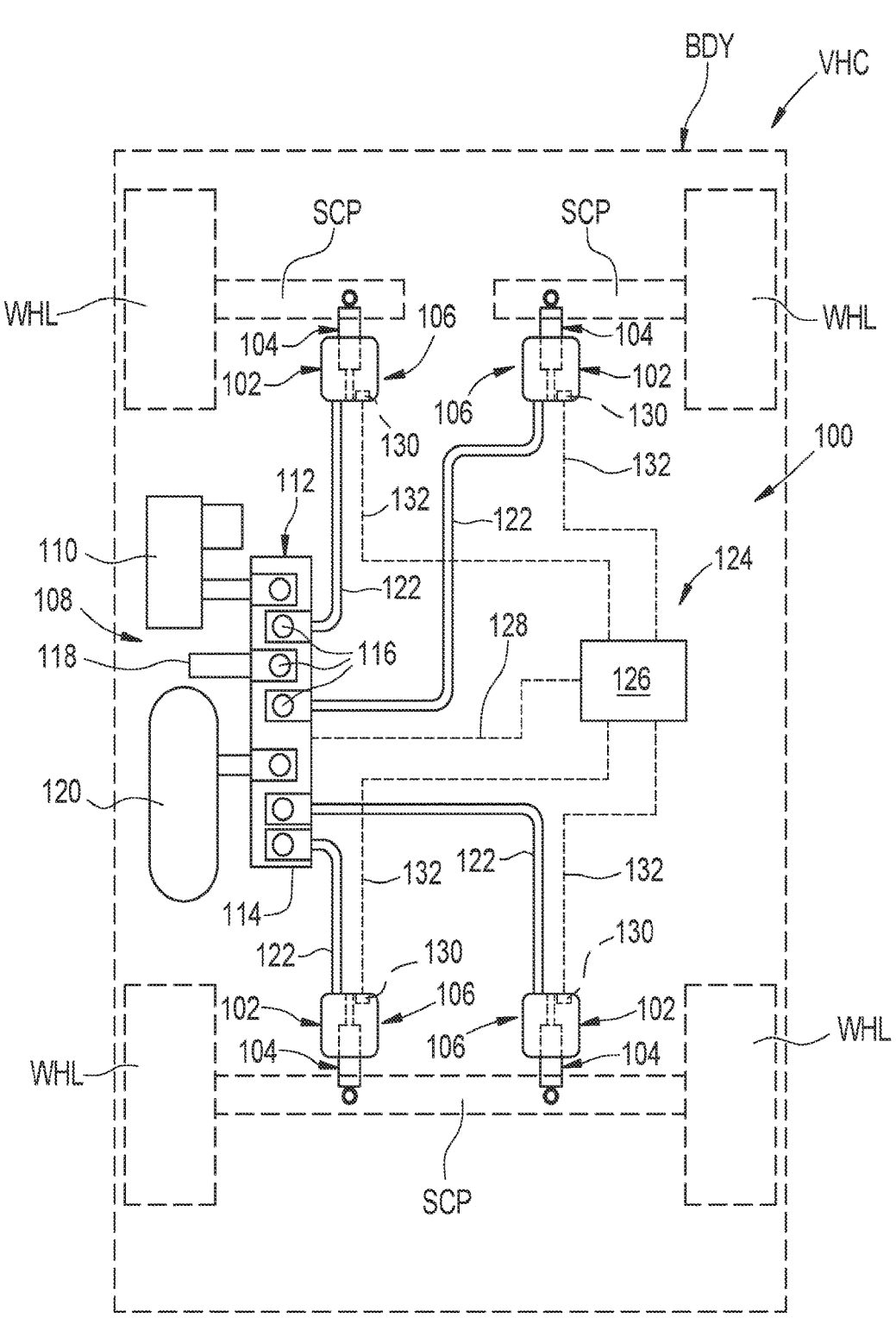
FIG. 1 is a schematic representation of one example of a suspension system of an associated vehicle that includes one or more gas spring assemblies in accordance with the subject matter of the present disclosure.

FIG. 1 illustrates one example of a suspension system 100 operatively disposed between a sprung mass, such as an associated vehicle body BDY, for example, and an unsprung mass, such as associated wheels WHL and/or associated suspension components SCP, for example, of an associated vehicle VHC. It will be appreciated that any one or more of the components of the suspension system can be operatively connected between the sprung and unsprung masses of the associated vehicle in any suitable manner. The suspension system includes one or more gas spring assemblies in accordance with the subject matter of the present disclosure as well as one or more damper assemblies that are operatively connected between the sprung and unsprung masses and together permit the sprung and unsprung masses of the associated vehicle to move in a somewhat controlled manner relative to one another, as discussed above.

Depending on desired performance characteristics and/or other factors, the one or more gas spring assemblies can, in some cases, be provided and installed separately from the one or more damper assemblies. Additionally, or in the alternative, a gas spring assembly can be assembled together with a damper assembly such that at least a portion of the gas spring assembly is axially coextensive with the damper assembly to form so-called gas spring and damper assemblies. It will be appreciated that gas spring assemblies and components thereof in accordance with the subject matter of the present disclosure are shown and described herein with particular reference to gas spring and damper assemblies. It is to be recognized and understood, however, that such a construction is optional and that gas spring assemblies in accordance with the subject matter of the present disclosure (as well as the components and assemblies thereof) are not intended to be limited to use in gas spring and damper assemblies.

As shown in FIG. 1, suspension system 100 can include a plurality of gas spring assemblies 102 that are operatively connected between the sprung and unsprung masses of the vehicle. Additionally, suspension system 100 can include a plurality of damper assemblies 104 that are operatively connected between the sprung and unsprung masses of the vehicle. Depending on desired performance characteristics and/or other factors, the suspension system can include any suitable number of one or more gas spring assemblies and one or more damper assemblies. Furthermore, the one or more gas spring assemblies and the one or more damper assemblies can be operatively connected on, along or otherwise between the sprung and unsprung masses in any suitable manner. As one non-limiting example, gas spring assembly 102 and damper assembly 104 can, optionally, be operatively connected in an axially-coextensive arrangement to form one or more gas spring and damper assemblies 106 that can then be operatively connected on, along or otherwise between the sprung and unsprung masses as a unit.

In the arrangement shown in FIG. 1, for example, suspension system 100 includes four gas spring and damper assemblies 106, one of which is disposed toward each corner of the associated vehicle adjacent a corresponding wheel WHL. It will be appreciated, however, that any other suitable number of gas spring and damper assemblies could alternately be used in any other configuration and/or arrangement. As illustrated in FIG. 1, gas spring and damper assemblies 106 are supported between suspension components SCP and body BDY of associated vehicle VHC. It will be recognized that gas spring assemblies 102 are shown and described herein as being of a rolling lobe-type construction. It is to be understood, however, that gas spring assemblies of other types, kinds and/or constructions could alternately be used without departing from the subject matter of the present disclosure.

Suspension system 100 also includes a pressurized gas system 108 operatively associated with the gas spring and damper assemblies for selectively supplying pressurized gas (e.g., air) thereto and selectively transferring pressurized gas therefrom. In the exemplary arrangement shown in FIG. 1, pressurized gas system 108 includes a pressurized gas source, such as a compressor 110, for example, for generating pressurized air or other gases. A control device, such as a valve assembly 112, for example, is shown as being in communication with compressor 110 and can be of any suitable configuration or arrangement. In the exemplary embodiment shown, valve assembly 112 includes a valve block 114 with a plurality of valves 116 supported thereon. Valve assembly 112 can also, optionally, include a suitable exhaust, such as a muffler 118, for example, for venting pressurized gas from the system. Optionally, pressurized gas system 108 can also include a reservoir 120 in fluid communication with compressor 110 and/or valve assembly 112 and suitable for storing pressurized gas for an extended period of time (e.g., seconds, minutes, hours, weeks, days, months).

Valve assembly 112 is in communication with gas springs 102 and/or dampers 104 of assemblies 106 through suitable gas transfer lines 122. As such, pressurized gas can be selectively transferred into and/or out of the gas springs and/or the dampers through valve assembly 112 by selectively operating valves 116, such as to alter or maintain vehicle height at one or more corners of the vehicle, for example.

Suspension system 100 can also include a control system 124 that is capable of communication with any one or more systems and/or components of vehicle VHC and/or suspension system 100, such as for selective operation and/or control thereof. Control system 124 can include a controller or electronic control unit (ECU) 126 communicatively coupled with compressor 110 and/or valve assembly 112, such as through a conductor or lead 128, for example, for selective operation and control thereof, which can include supplying and exhausting pressurized gas to and/or from gas spring and damper assemblies 106. Controller 126 can be of any suitable type, kind and/or configuration.

Control system 124 can also, optionally, include one or more sensing devices 130, such as, for example, may be operatively associated with the gas spring and damper assemblies and capable of outputting or otherwise generating data, signals and/or other communications having a relation to one or more of: a height of the gas spring and damper assemblies; a distance between other components of the vehicle; a pressure or temperature having a relation to the gas spring and damper assembly and/or a wheel or tire or other component associated with the gas spring and damper assembly; and/or an acceleration, load or other input acting on the gas spring and damper assembly. Sensing devices 130 can be in communication with ECU 126, which can receive the data, signals and/or other communications therefrom. The sensing devices can be in communication with ECU 126 in any suitable manner, such as through conductors or leads 132, for example. Additionally, it will be appreciated that the sensing devices can be of any suitable type, kind and/or construction and can operate using any suitable combination of one or more operating principles and/or techniques.

Figure 2:
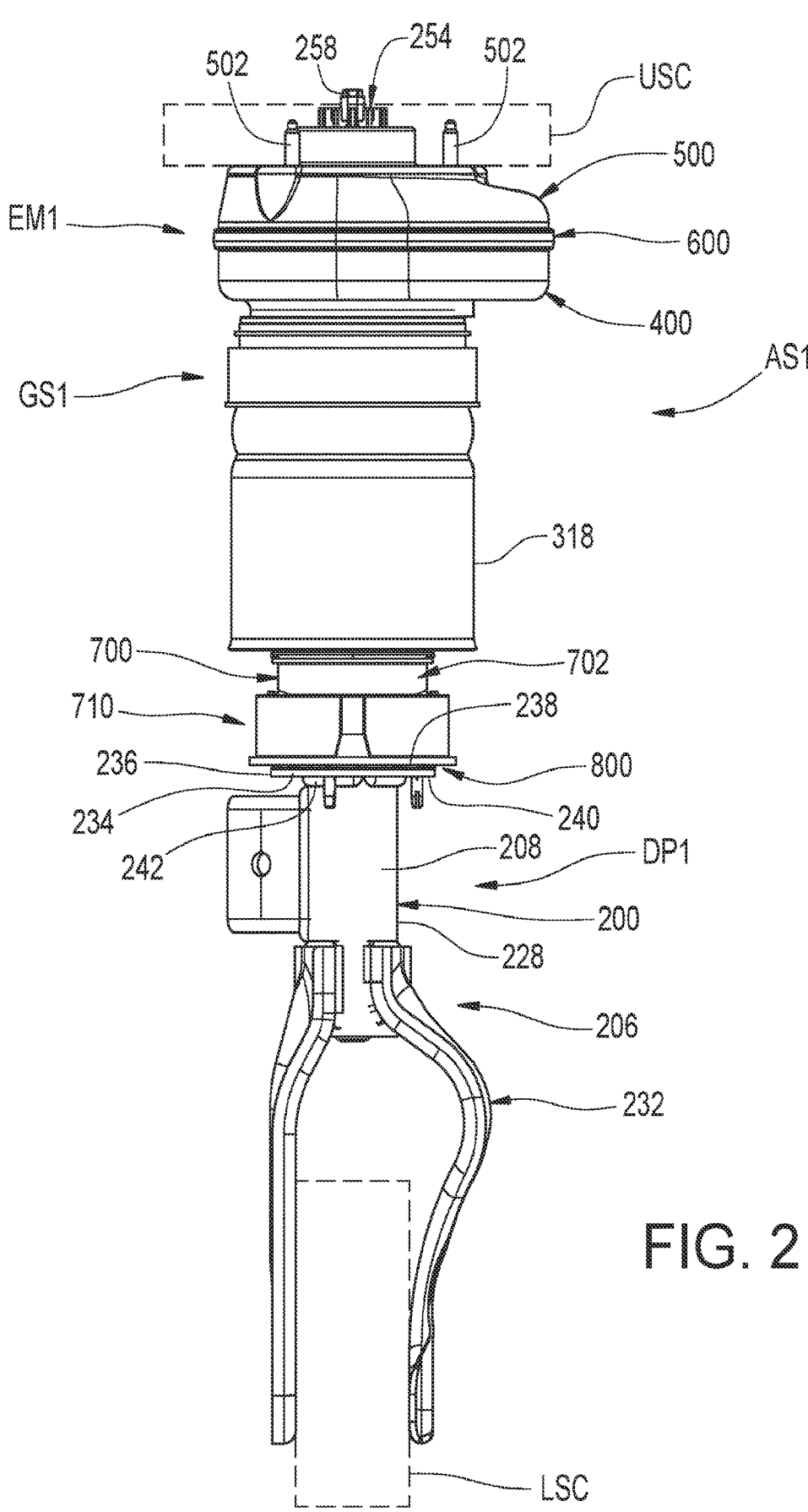
FIG. 2 is a side elevation view of one example of a gas spring and damper assembly including an exemplary gas spring assembly in accordance with the subject matter of the present disclosure.
Figure 3:
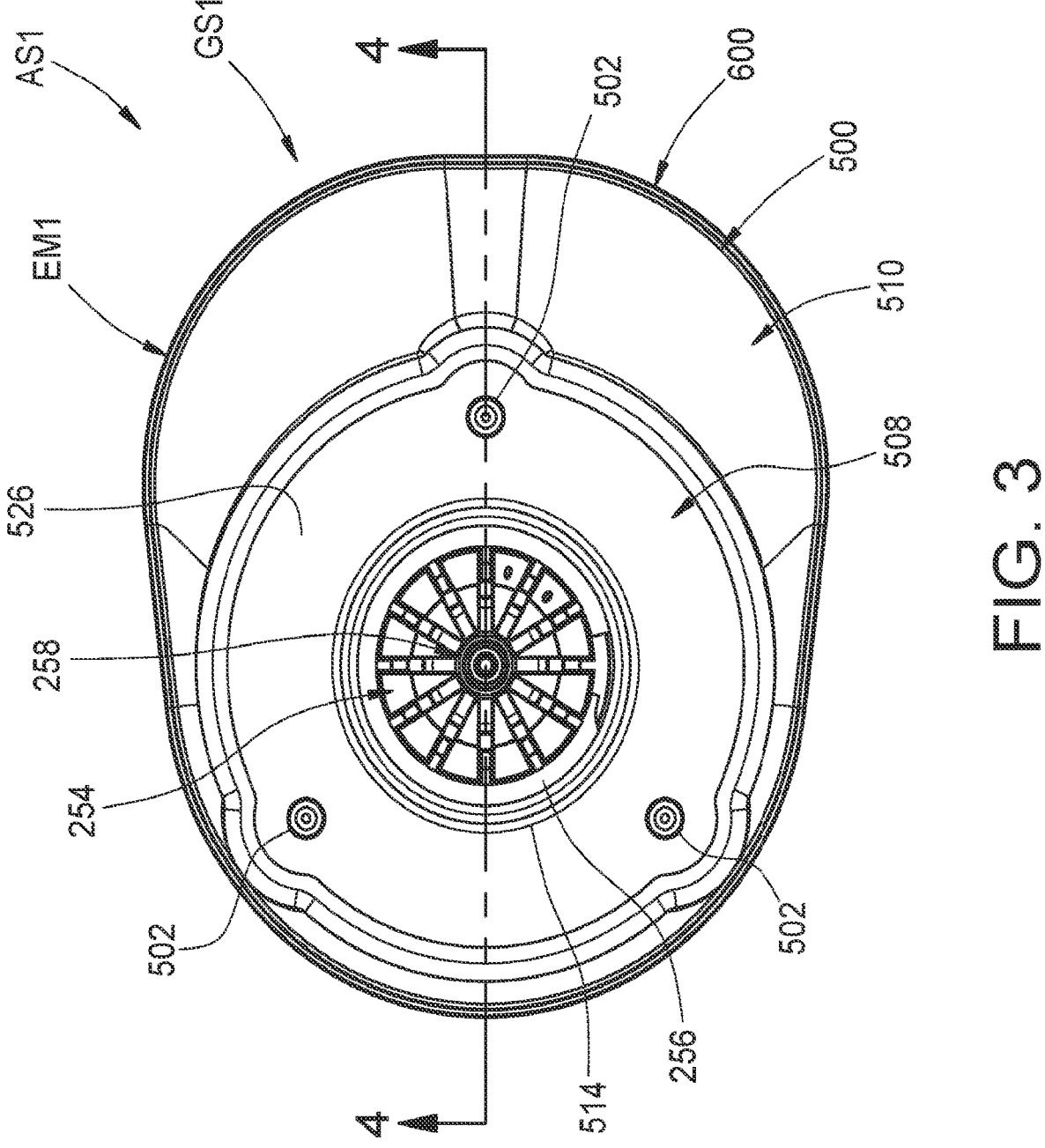
FIG. 3 is a top plan view of the gas spring and damper assembly in FIG. 2.
Figure 4:
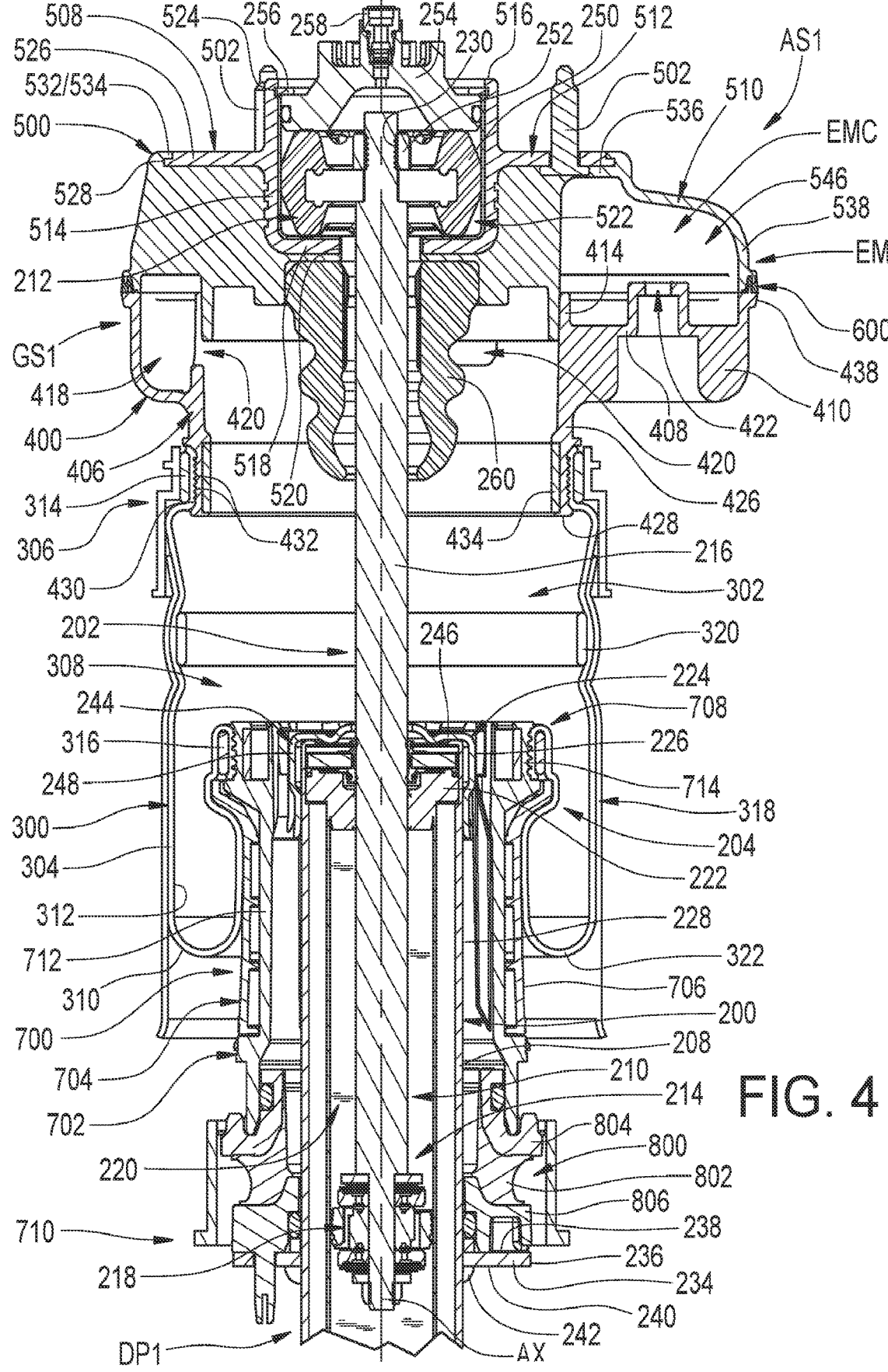
FIG. 4 is a cross-sectional side view of the gas spring and damper assembly in FIGS. 2 and 3 taken from along line 4-4 in FIG. 3.
Figure 5:
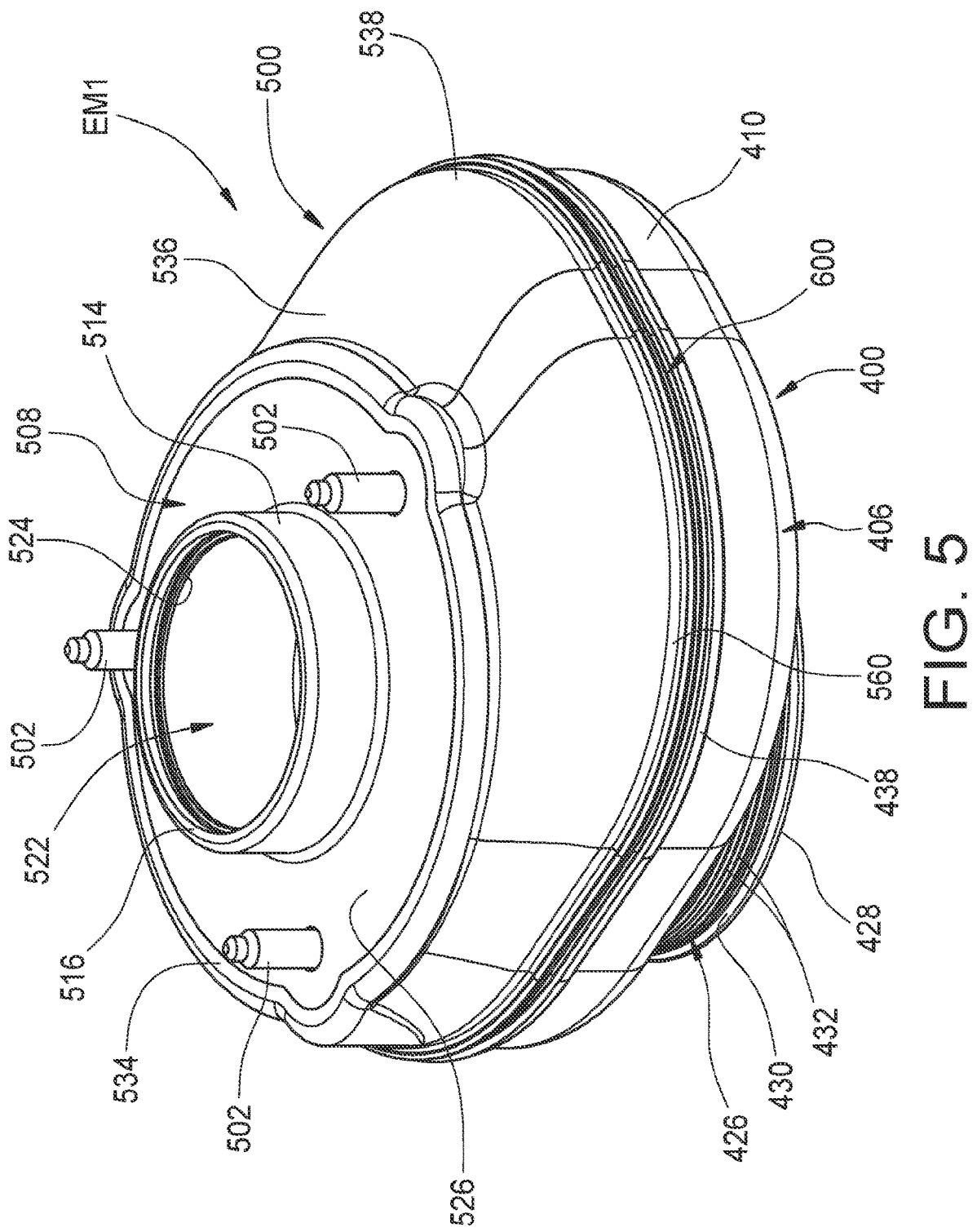
FIG. 5 is a top perspective view of an end member assembly in accordance with the subject matter of the present disclosure, such as is shown in FIGS. 2-4, for example.
Figure 6:
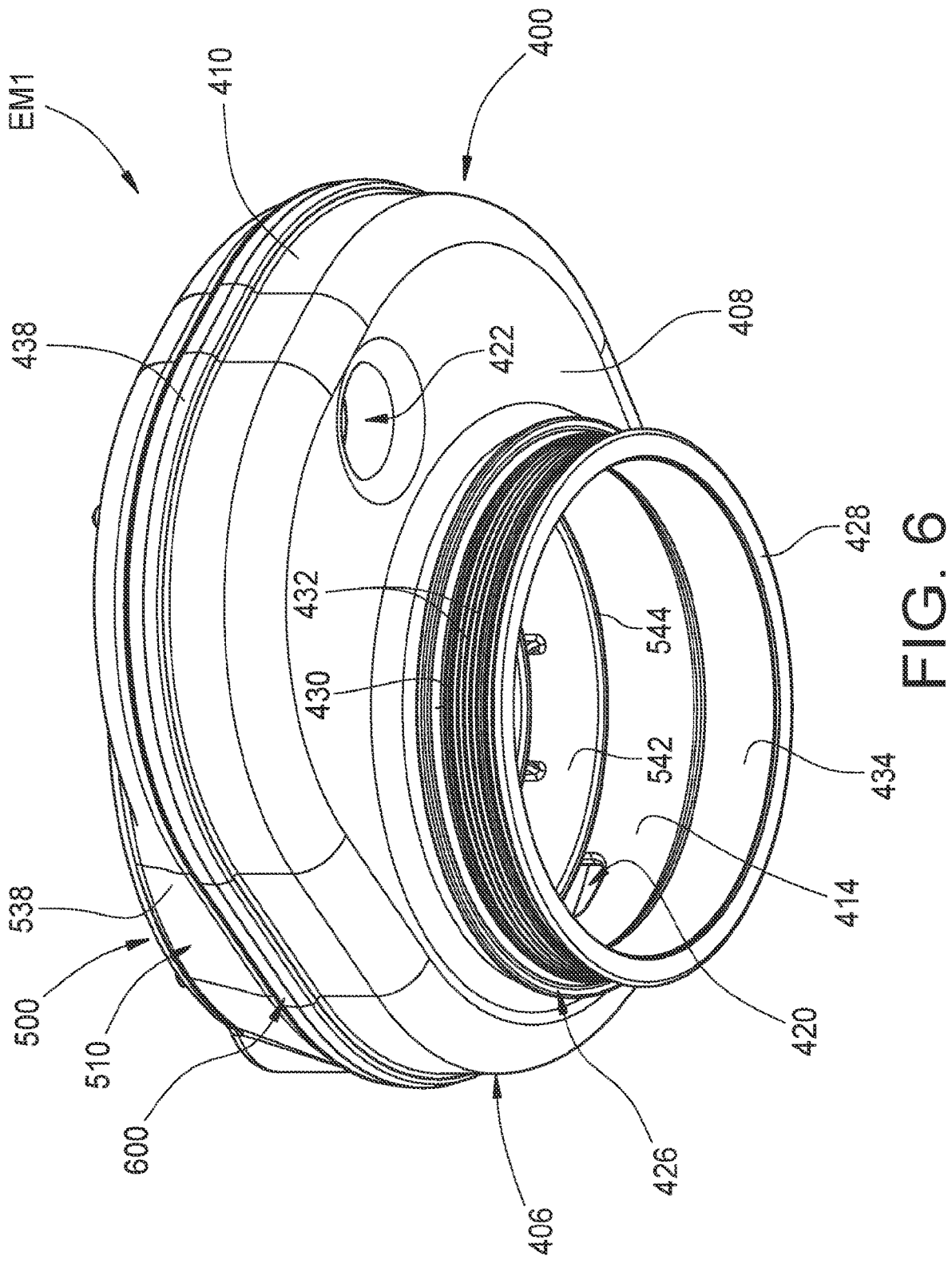
FIG. 6 is a bottom perspective view of the end member assembly in FIGS. 2-5.
Figure 7:
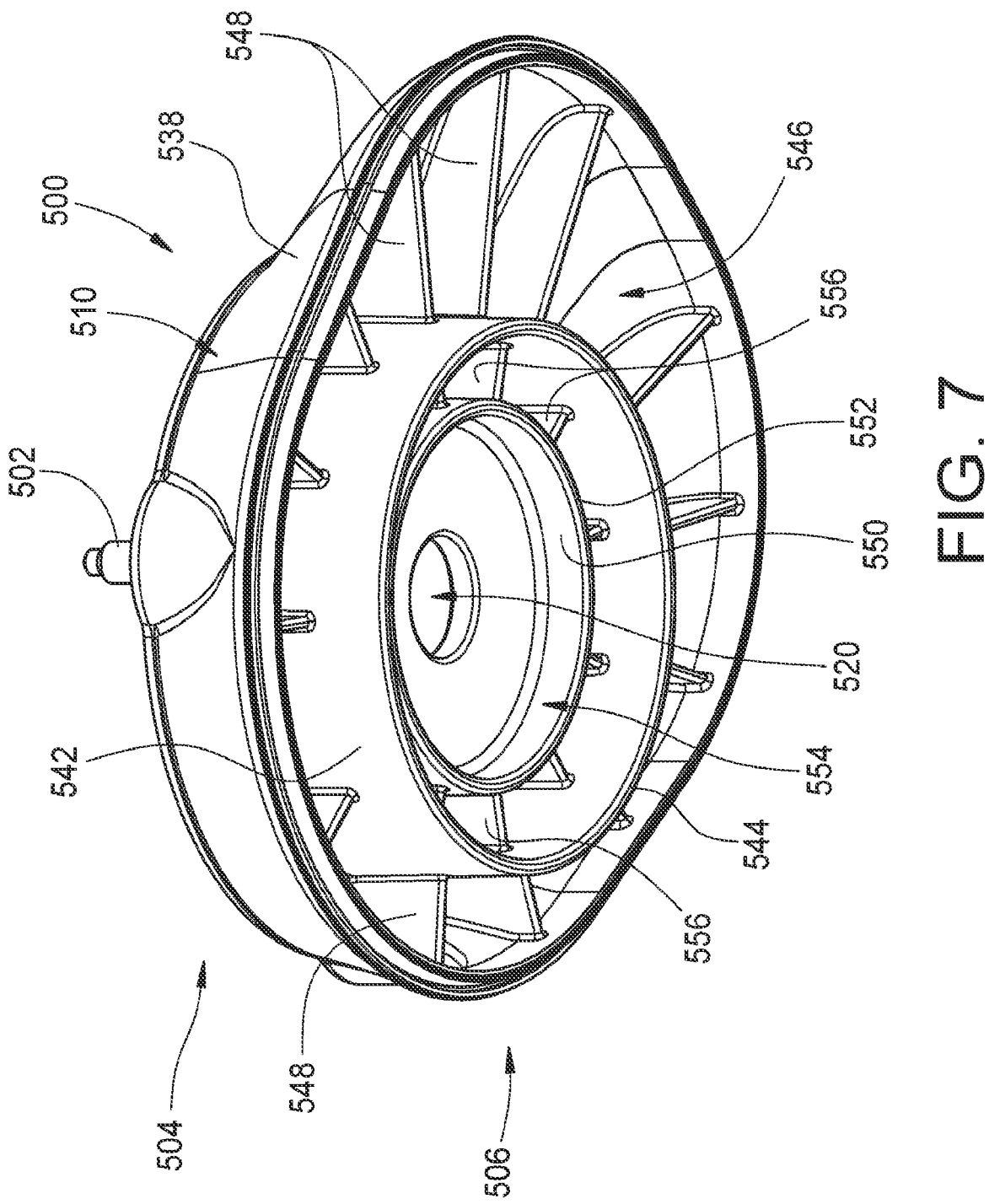
FIG. 7 is a bottom perspective view of one end member component of the end member assembly shown in FIGS. 2-6.
Figure 8:
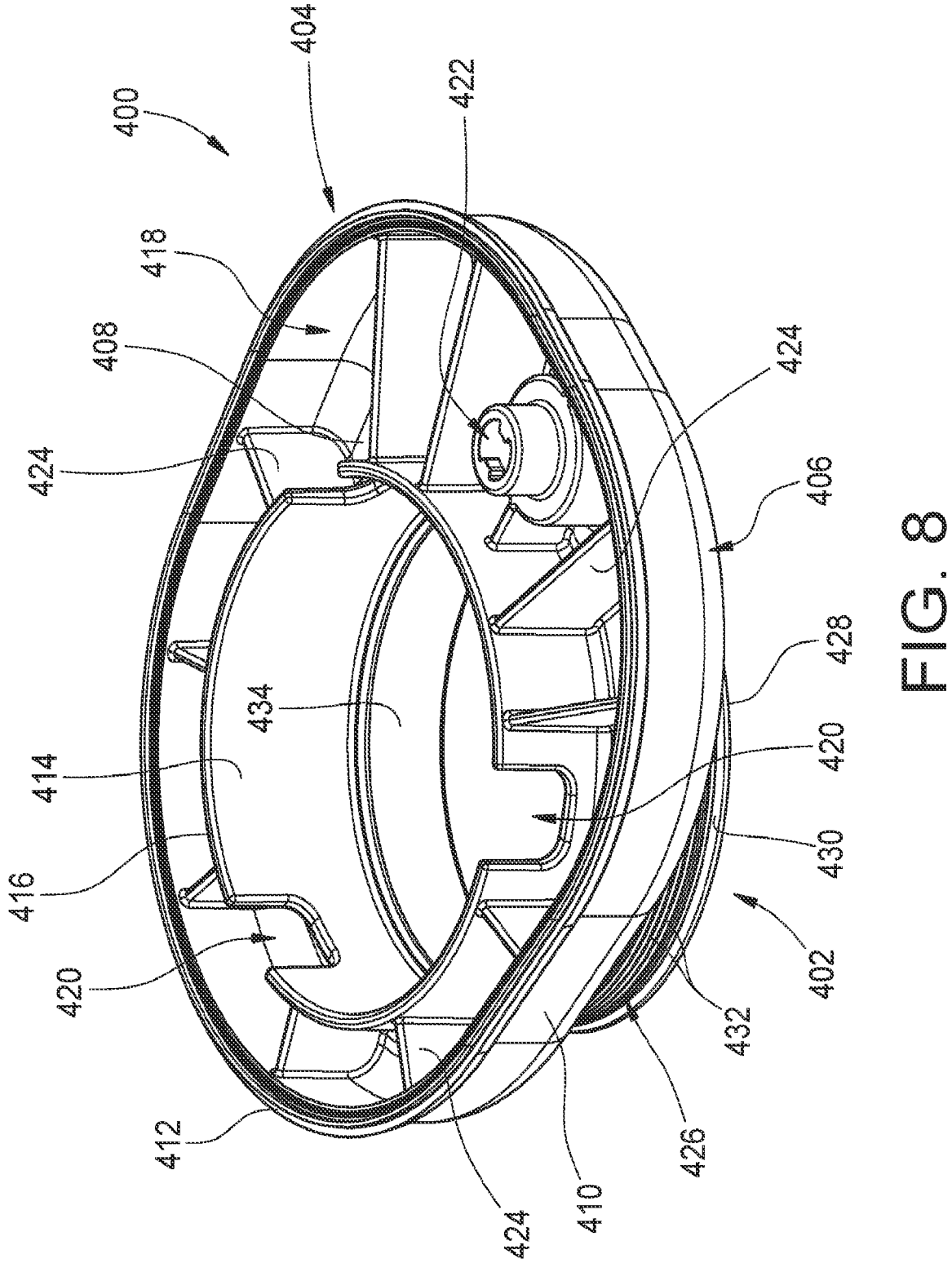
FIG. 8 is a top perspective view of another end member component of the end member assembly shown in FIGS. 2-6.

Having described an example of a suspension system (e.g., suspension system 100) that can include gas spring assemblies in accordance with the subject matter of the present disclosure, an example of a gas spring and damper assembly including such a gas spring assembly will now be described in connection with FIGS. 2-4. As shown therein, a gas spring and damper assembly AS1, such as may be suitable for use as one or more of gas spring and damper assemblies 106 in FIG. 1, is shown as including a gas spring (or gas spring assembly) GS1, such as may correspond to one of gas springs 102 in FIG. 1, for example, and a damper (or damper assembly) DP1 such as may correspond to one of dampers 104 in FIG. 1, for example. Gas spring assembly GS1 and damper assembly DP1 can be disposed in a coextensive arrangement with one another, and can be operatively secured to one another in any suitable manner, such as is described hereinafter, for example. A longitudinal axis AX extends lengthwise along assembly AS1, as shown in FIG. 4.

Damper assembly DP1 can include a damper housing 200 and a damper rod assembly 202 that is at least partially received in the damper housing. Damper housing 200 extends axially between housing ends 204 and 206, and includes a housing wall 208 that at least partially defines a damping chamber 210. Damper rod assembly 202 extends lengthwise between opposing ends 212 and 214 and includes an elongated damper rod 216 and a damper piston 218 disposed along end 214 of damper rod assembly 202. Damper piston 218 is received within damping chamber 210 of damper housing 200 for reciprocal movement along the housing wall in a conventional manner. A quantity of damping fluid 220 can be disposed within damping chamber 210, and damper piston 218 can be displaced through the damping fluid to dissipate kinetic energy acting on gas spring and damper assembly AS1. Though damper assembly DP1 is shown and described herein as having a conventional construction in which a hydraulic fluid is contained within at least a portion of damping chamber 210, it will be recognized and appreciated that dampers of other types, kinds and/or constructions, such as pressurized gas or "air" dampers, for example, could be used without departing from the subject matter of the present disclosure.

Housing wall 208 can form an opening (not numbered) along housing end 204. A damper end wall 222 can extend across the opening and can be secured on or along housing wall 218 such that a substantially fluid-tight connection is formed therebetween. Damper end wall 222 can include an opening (not numbered) and elongated damper rod 216 can extend axially outward from damping chamber 210 through the opening in a direction opposite housing end 206. Additionally, a damper end wall (not numbered) can be connected across end 206 of damper housing 200 such that a substantially fluid-tight connection is formed therebetween. In some cases, an end cap 224 (which is sometimes referred to in the art as a striker cap) that includes an outer side surface portion 226 can be supported on or along end 204 of damper housing 200. In other cases, an outside surface portion 228 of housing wall 208 can be exposed on or along end 204 of the damper housing.

Elongated damper rod 216 can project outwardly from damper end wall 222 such that end 212 of the damper rod assembly is outwardly exposed from the damper housing and is externally accessible with respect to the damper housing. A connection structure 230, such as a plurality of threads, for example, can be provided on or along the elongated rod for use in operatively connecting gas spring and damper assembly 200, either directly or indirectly, to an associated vehicle structure, a component of gas spring assembly GS1 or another component of gas spring and damper assembly AS1.

It will be appreciated that gas spring and damper assembly AS1 can be operatively connected between associated sprung and unsprung masses of an associated vehicle (or other construction) in any suitable manner. For example, one end of the assembly can be operatively connected to an associated sprung mass with the other end of the assembly disposed toward and operatively connected to an associated unsprung mass. As shown in FIG. 2, for example, end 212 of damper rod assembly 202 can be operatively engaged (either directly or indirectly) with a first or upper structural component USC, such as associated vehicle body BDY in FIG. 1, for example, and can be secured thereon in any suitable manner. As one non-limiting example, gas spring assembly GS1 can include an end member assembly EM1 that can be secured to upper structural component USC and to which one or more other components of the gas spring assembly and/or one or more components of damper assembly DS1 can be operatively connected. Additionally, or in the alternative, damper assembly DP1 can include a mounting bracket 232 disposed along end 206 of damper housing 200, which can be secured on or along a second or lower structural component LSC (FIG. 2), such as associated suspension component SCP in FIG. 1, for example, and can be secured thereon in any suitable manner.

Gas spring assembly GS1 can include a flexible spring member 300 that can extend peripherally around axis AX and can be secured between opposing end members (or end member assemblies) in a substantially fluid-tight manner such that a spring chamber 302 is at least partially defined therebetween. As a non-limiting example, end member assembly EM1 can include an end member section 400 to which one end of flexible spring member 300 can be secured, an end member section 500 to which end 212 of damper rod assembly 202 can be operatively connected, and an end member section 600 injection molded in situ with end member sections 400 and 500. Gas spring assembly GS1 can also include an end member 700 that is supported on or along damper housing 200. The end of flexible spring member 300 that is opposite end member assembly EM1 can be secured on or along end member 700 in any suitable manner. Additionally, it will be appreciated that end member 700 can be operatively supported on or along damper housing 200 in a suitable manner. As a non-limiting example, damper assembly DP1 can include a support wall or support wall portion 234 that extends radially outward from along the damper housing toward an outer peripheral edge 236. Support wall portion 234 can include a surface portion 238 facing toward end 204 of damper housing 200 and a surface portion 240 facing toward end 206 of the damper housing. Support wall portion 234 can be supported on or along the damper housing in any suitable manner, such as by way of one or more flowed-material joints 242, for example. If included, end cap 224 can include a cap wall 244 with an end wall portion 246 oriented transverse to longitudinal axis AX and a side wall portion 248 extending axially about the longitudinal axis. Side wall portion 248 can include outer side surface portion 226 that faces radially outward and forms an outermost peripheral extent of damper assembly DP1 along end 204 of the damper housing.

It will be appreciated that flexible spring member 300 can be of any suitable size, shape, construction and/or configuration. Additionally, the flexible spring member can be of any type and/or kind, such as a rolling lobe-type or convoluted bellows-type construction, for example. Flexible spring member 300 is shown in FIGS. 2-4 as including a flexible wall 304 that can be formed in any suitable manner and from any suitable material or combination of materials. For example, the flexible wall can include one or more fabric-reinforced, elastomeric plies or layers and/or one or more un-reinforced, elastomeric plies or layers. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 304 can extend in a generally longitudinal direction between opposing ends 306 and 308. Additionally, flexible wall 304 can include an outer surface 310 and an inner surface 312 with the inner surface at least partially defining spring chamber 302 of gas spring assembly GS1. Flexible wall 304 can include an outer or cover ply (not identified) that at least partially forms outer surface 310. Flexible wall 304 can also include an inner or liner ply (not identified) that at least partially forms inner surface 312. In some cases, flexible wall 304 can further include one or more reinforcing plies (not shown) disposed between outer and inner surfaces 310 and 312. The one or more reinforcing plies can be of any suitable construction and/or configuration. For example, the one or more reinforcing plies can include one or more lengths of filament material that are at least partially embedded therein. Additionally, it will be appreciated that the one or more lengths of filament material, if provided, can be oriented in any suitable manner. As one example, the flexible wall can include at least one layer or ply with lengths of filament material oriented at one bias angle and at least one layer or ply with lengths of filament material oriented at an equal but opposite bias angle.

Flexible spring member 300 can include any feature or combination of features suitable for forming a substantially fluid-tight connection with end member section 400 of end member assembly EM1 and/or suitable for forming a substantially fluid-tight connection with end member 700. As one example, flexible spring member 300 can include open ends that are secured on or along the corresponding end members by way of one or more crimp rings 314 and 316. Alternately, a mounting bead (not shown) can be disposed along either or both of the ends of the flexible wall. In some cases, the mounting bead, if provided, can, optionally, include a reinforcing element, such as an endless, annular bead wire, for example. In some cases, a restraining cylinder 318 and/or other components can be disposed radially outward along flexible wall 304. In some cases, such components can be secured on or along the flexible wall in a suitable manner, such as by way or one or more backing rings 320, for example.

As mentioned above, gas spring and damper assembly AS1 can be disposed between associated sprung and unsprung masses of an associated vehicle in any suitable manner. For example, one component can be operatively connected to the associated sprung mass with another component disposed toward and operatively connected to the associated unsprung mass. As shown in FIGS. 2-4, for example, end member section 500 can include one or more fasteners 502 operable to secure end member assembly EM1 on or along upper structural component USC, such as associated vehicle body BDY in FIG. 1, for example. Damper assembly DP1 can be operatively connected to the upper structural component by way of end member assembly EM1, and can be operatively engaged with the end member assembly in any suitable manner. For example, damper assembly DP1 can include a bushing 250 supported on or along end member section 500 and to which damper rod assembly 202 is secured, such as by way of a connector 252 engaging connection structure 230 along end 212 of elongated damper rod 216, for example. Bushing 250 can be supported on or along end member section 500 and can be operatively secured thereto in any suitable manner. As a non-limiting example, bushing 250 could be captured between end member section 500 and an end cap 254 that can be secured on or along the end member section in a suitable manner, such as by way of a retaining ring 256, for example. In some cases, a connector fitting 258 can extend through or otherwise be disposed on or along end cap 254, such as may provide communicative coupling of electrical and/or pressurized gas systems and/or devices with gas spring and damper assembly AS1.

It will be appreciated that gas spring and damper assembly AS1 is displaceable, during use in normal operation, between extended and compressed conditions. In some cases, one or more jounce bumpers can be included to inhibit contact between one or more features and/or components of assembly AS1. For example, damper assembly DP1 can include a jounce bumper 260 positioned on or along elongated damper rod 216 within spring chamber 302. It will be appreciated that the jounce bumper, if provided, can be supported in any suitable manner. As a non-limiting example, jounce bumper 260 can be supported on or along end member section 400 of end member assembly EM1 to substantially inhibit contact between a component of damper assembly DP1 and end member section 400 during a full jounce condition of assembly AS1. It will be appreciated, however, that other configurations and/or arrangements could alternately be used.

Additionally, it will be appreciated that components of gas spring and damper assembly AS1 can, in some cases, experience or otherwise undergo relative rotation during displacement of the gas spring and damper assembly between extended and compressed conditions. It will be appreciated that such relative rotation can be disadvantageous to flexible spring member 300 and/or other components, and that gas spring and damper assemblies commonly include on or more features, components and/or constructions operable to isolate such relative rotation from the flexible spring member. For example, in some cases, the operative connection to upper structural component USC can include one or more rotatable or twistable components. In such cases, end member 700 can be directly supported in a substantially-fixed rotational position on or along the support wall of the damper assembly. In other cases, however, end member assembly EM1 can be secured on or along upper structural component USC in a substantially-fixed rotational orientation. In such cases, gas spring and damper assembly AS1 can include a torsional isolator 800 that can be supported on or along support wall portion 234 of damper assembly DP1. Torsional isolator 800 can include an elastomeric or otherwise compliant body 802 supported between a (comparatively) rigid body 804 and a (comparatively) rigid body 806. It will be appreciated that compliant body 802 can be permanently secured (i.e., inseparable without damage, destruction or material alteration of at least one of the component parts) to and/or between rigid bodies 804 and 806, such as by way of a cured joint (e.g., vulcanized) and/or a flowed-material joint. It will be appreciated that torsional isolator 800 can be supported between support wall portion 234 and end member 700 in any suitable manner.

End member 700 is of a type and kind commonly referred to as a roll-off piston or piston assembly. It will be appreciated that end member 700 can include any suitable number of one or more components and/or elements. For example, in the arrangement shown and described herein, end member 700 includes an end member core 702 that is disposed along and supported on damper housing 200, such as by way of torsional isolator 800, as described above. An end member shell (or shell section) 704 is supported on the end member core and can include an outer surface 706 along which a rolling lobe 322 of flexible spring member 300 can be displaced as gas spring and damper assembly AS1 is displaced between compressed and extended conditions. It will be appreciated that end member core 702 can be configured to receive and support one or more end member shells and/or shell sections, such as may have any one of a wide variety of different sizes, shapes and/or configurations (e.g., outer profiles with different combinations of contours and/or shapes).

Additionally, it will be appreciated that end member 700 and the one or more components and/or elements thereof can be formed from any suitable material or combination of materials, and can include any suitable number or combination of one or more walls and/or wall portions. For example, end member core 702 and/or end member shell sections 704 can be formed from a suitable polymeric material or combination of polymeric materials, such as a fiber-reinforced polypropylene, a fiber-reinforced polyamide, or an unreinforced (i.e., relatively high-strength) thermoplastic (e.g., polyester, polyethylene, polyamide, polyether or any combination thereof), for example.

End member core 702 is shown as extending peripherally about axis AX and longitudinally between opposing ends 708 and 710. End member core 702 can include a core wall 712 that extends peripherally about axis AX with a mounting wall portion 714 toward end 708 on or along which end 308 of flexible spring member 300 can be operatively connected in a suitable manner. For example, retaining ring 316 can be crimped radially-inward or otherwise deformed to form a substantially fluid-tight connection between end 308 of flexible spring member 300 and mounting wall portion 714 of end member core 702. In this manner, spring chamber 302 can be at least partially defined by flexible spring member 300 between end member section 400 and end member 700.

As discussed above, end member assembly EM1 is configured to interconnect flexible spring member 300 of gas spring assembly GS1 and damper rod assembly 202 of damper assembly DP1 as well as to operatively connect the gas spring assembly and the damper assembly to an associated structural component, such as upper structural component USC, for example. As discussed above, end member assembly EM1 is at least partially formed from end member sections 400, 500 and 600, which are described in additional detail hereinafter in connection with FIGS. 2-14. End member assembly EM1 includes an end member chamber EMC that is at least partially defined by one or more of end member sections 400, 500 and/or 600 with the end member chamber disposed in fluid communication with spring chamber 302 in a suitable manner, such as is discussed hereinafter.

End member section 400 extends axially between an end 402 disposed away from end member section 500 and an end 404 disposed toward end member section 500. End member section 400 includes a section wall 406 at least partially formed from polymeric material, preferably by way of an injection molding process, and can include any suitable number of walls and/or wall portions. For example, section wall 406 can include an end wall portion 408 that is oriented transverse to longitudinal axis AX and extends peripherally outward toward an outer side wall portion (or outer peripheral wall portion) 410 that extends axially from along end wall portion 408 toward a distal edge 412. Section wall 406 can also include an inner side wall portion 414 that is spaced peripherally inward of outer side wall portion 410 and extends axially from along end wall portion 408 toward a distal edge 416. End member section 400 can include a chamber portion 418 that is at least partially defined by section wall 406 between outer and inner side wall portions 410 and 414, and which at least partially defines end member chamber EMC. In some cases, one or more openings 420 can, optionally, be provided on or along inner side wall portion 414, such as may be suitable for permitting fluid communication between end member chamber EMC and spring chamber 302. Additionally, in some cases, a communication port 422 can extend through end wall portion 408, such as may be suitable for operatively connecting a pneumatic fitting or other connector to end member section 400, for example. Furthermore, in some cases, one or more connector wall portions 424 can extend between and operatively connect outer and inner side wall portions 410 and 414. If included, a plurality of connector wall portions 424 can be spaced apart from one another peripherally about longitudinal axis AX.

Section wall 406 can also include a mounting wall portion 426 that extends from along end wall portion 408 in a direction toward end 402 to a distal edge 428. Mounting wall portion 426 can include an outer surface portion 430 that is dimensioned to receivingly engage end 306 of flexible spring member 300. As discussed above, end 306 of the flexible spring member can be secured on or along end member section 400 in any suitable manner, such as by way of crimp ring 314, for example. In some cases, mounting wall portion 426 can include one or more axially-spaced, endless annular grooves 432 formed therealong such as may be suitable for abuttingly engaging end 306 of flexible spring member 300. In some cases, a backing ring 434 can be disposed on or along mounting wall portion 426 radially inward of outer surface portion 430. If provided, it will be appreciated that backing ring 434 can take the form of an annular ring formed from a material that is substantially more rigid than the material of section wall 406 (e.g., a metal material vs a polymeric material). In some cases, backing ring 434, if included, can be installed on or along mounting wall portion 426 after the mounting wall portion is molded or otherwise formed. In other cases, backing ring 434 can be overmolded together with section wall 406 during the process of molding or otherwise forming end member section 400.

As shown in FIGS. 8-14, outer side wall portion 410 includes an end surface portion 436 disposed along distal edge 412 that is oriented transverse to longitudinal axis AX. End surface portion 436 extends radially outward to an outer peripheral edge surface portion 438. Section wall 406 also includes a projection wall portion 440 that extends axially outward from along end surface portion 436 in a direction toward a distal edge 442. In some cases, projection wall portion 440 extends peripherally around end member section 400 spaced peripherally inward of outer peripheral edge surface portion 438 such that at least some of end surface portion 436, as identified by reference number 436A, is disposed peripherally inward of projection wall portion 440 and some of end surface portion 436, as identified by reference number 436B, is disposed peripherally outward of the projection wall portion. In some cases, an alignment or assembly structure can be included on or along end member section 400, such as may be suitable for positive engagement with a corresponding alignment or assembly structure of end member section 500. In the exemplary arrangement shown in FIGS. 4 and 8-14, section wall 406 can, optionally, include a projection wall portion 444 that extends axially outward from along end surface portion 436 in a direction toward a distal edge 446. If included, projection wall portion 444 can extend peripherally around end member section 400 spaced peripherally inward of outer peripheral edge surface portion 438 such that at least some of end surface portion 436 is disposed peripherally outward of projection wall portion 444. In a preferred arrangement, projection wall portion 444 is also spaced peripherally inward of projection wall portion 440.

Figure 9:
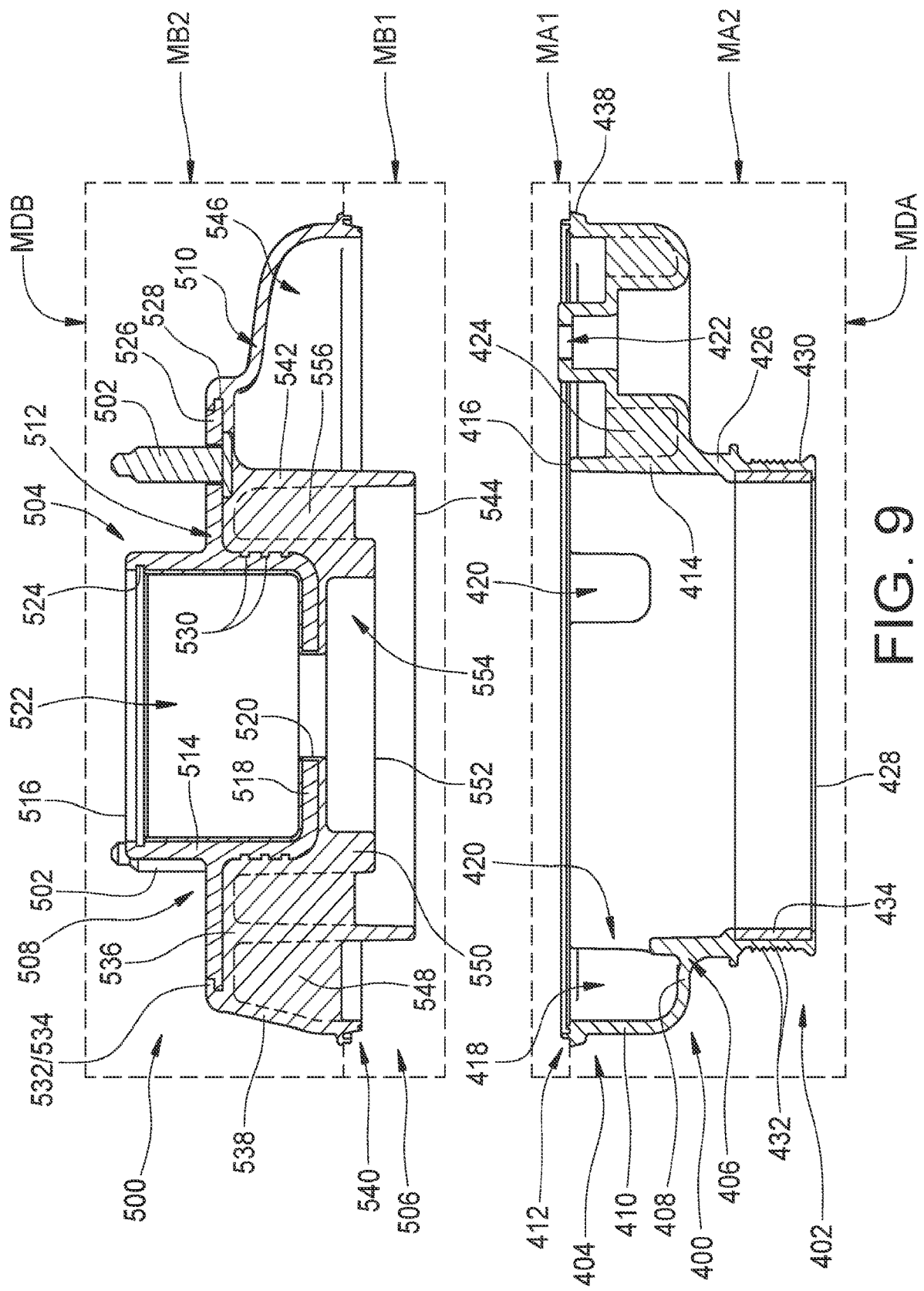
FIG. 9 is a cross-sectional side elevation view illustrating two end member components of FIGS. 2-8 manufactured separately from one another in individual molds.

In a preferred arrangement, section wall 402 of end member section 400 can be manufactured or otherwise formed within a cavity (not numbered) of an injection mold, such as is represented in FIG. 9 by dashed lines MDA. Additionally, it will be appreciated that section wall 402 can be molded from any suitable polymeric material or combination of polymeric materials, such as a fiber-reinforced polypropylene, a fiber-reinforced polyamide, or an unreinforced (i.e., relatively high-strength) thermoplastic (e.g., polyester, polyethylene, polyamide, polyether or any combination thereof), for example.

With reference, now, to FIGS. 4, 5, 7 and 9-14, end member section 500 extends axially between an end 504 disposed away from end member section 400 and an end 506 disposed toward end member section 400. In some cases, end member section 500 can, optionally, include a mounting body (or mounting insert) 508. With or without the mounting body, end member section 500 includes a section wall 510 that is at least partially formed from polymeric material, such as may be formed by an injection molding process as discussed hereinafter. In some cases, section wall 510 can be overmolded on mounting body 508, if included, such as by way of an injection molding process as discussed hereinafter. If included, mounting body 508 can be formed from a material that is substantially more rigid than the material of section wall 510 (e.g., a metal material vs a polymeric material).

As a non-limiting example, mounting body 508, if included, can include a body wall 512 with a side wall portion 514 extending from a distal edge 516 disposed along end 504 toward an end wall portion 518 that is oriented transverse to longitudinal axis AX. End wall portion 518 includes an opening 520 through which end 212 of elongated damper rod 216 extends. Side wall portion 514 and end wall portion 518 can at least partially define a recess 522 within mounting body 508 that is dimensioned to receive bushing 250, which can be captured between end wall portion 518 and end cap 254, such as by way of retaining ring 256 operatively engaging an annular groove 524 formed along side wall portion 514 toward distal edge 516, for example.

Body wall 512 of mounting body 508 also includes a flange wall portion 526 that extends peripherally outward from along side wall portion 514 toward an outer peripheral edge 528. Fasteners 502 are secured on or along flange wall portion 526 in a suitable manner and are spaced peripherally inward of outer peripheral edge 528. In the exemplary arrangement shown, fasteners 502 project axially outwardly from flange wall portion 526 in a direction away from end 506 of end member section 500. It will be appreciated, however, that other configurations and/or arrangements could alternately be used. As indicated above, in a preferred construction, section wall 510 is overmolded on mounting body 508 such that at least a portion of body wall 512 is encapsulated or otherwise covered by section wall 510. Additionally, any suitable combination of wall portions and/or other structures can be used to interengage section wall with mounting body 508. For example, body wall 512 can include one or more annular grooves 530 that extend radially into the body wall and into which portions (not numbered) of section wall 510 flow during the injection molding process. It will be appreciated that grooves 530 are merely exemplary and that other combinations of structural features could alternately be used, such as annular projections or knurled surface treatments, for example. Additionally, or in the alternative, an edge recess 532 can be included on or along flange wall portion 526, such as along outer peripheral edge 528, for example. If included, portion 534 of section wall 510 could flow around flange wall portion 526 and into edge recess 532 to at least partially encapsulate outer peripheral edge 528 of the mounting body.

Section wall 510 can include an end wall portion 536 that is oriented transverse to longitudinal axis AX and extends along one or more sides of flange wall portion 526. End wall portion 536 can extend peripherally outward toward an outer side wall portion (or outer peripheral wall portion) 538 that extends axially from along end wall portion 536 toward a distal edge 540. Section wall 510 can also include an inner side wall portion 542 that is spaced peripherally inward of outer side wall portion 538 and extends axially from along end wall portion 536 toward a distal edge 544. End member section 500 can include a chamber portion 546 that is at least partially defined by section wall 510 between outer and inner side wall portions 538 and 542, and which at least partially defines end member chamber EMC. In an assembled condition of end member assembly EM1, chamber portion 546 can be disposed in fluid communication with chamber portion 418 of end member section 400 to substantially completely define end member chamber EMC. In some cases, one or more connector wall portions 548 can extend between and operatively connect outer and inner side wall portions 538 and 542. If included, a plurality of connector wall portions 548 can be spaced apart from one another peripherally about longitudinal axis AX.

Section wall 510 can also, optionally, include a mounting wall portion 550 that extends axially from along end wall portion 518 of mounting body 508 toward a distal end 552 disposed toward end 506 of the end member section. Mounting wall portion 550 can be spaced peripherally inward of inner side wall portion 542 to at least partially define a bumper mounting recess 554 dimensioned to at least partially receive and retain jounce bumper 260 on or along end member section 500. In some cases, one or more connector wall portions 556 can extend between and operatively connect inner side wall portion 542 and mounting wall portion 550. If included, a plurality of connector wall portions 556 can be spaced apart from one another peripherally about longitudinal axis AX.

As shown in FIGS. 7 and 9-14, outer side wall portion 538 includes an end surface portion 558 disposed along distal edge 540 that is oriented transverse to longitudinal axis AX. End surface portion 558 extends radially outward to an outer peripheral edge surface portion 560. Section wall 510 also include a projection wall portion 562 that extends axially outward from along end surface portion 558 in a direction toward a distal edge 564. In some cases, projection wall portion 562 will extend peripherally around end member section 500 spaced peripherally inward of outer peripheral edge surface portion 560 such that at least some of end surface portion 558, as identified by reference number 558A, is disposed peripherally inward of projection wall portion 562 and some of end surface portion 558, as identified by reference number 558B, is disposed peripherally outward of the projection wall portion.

Outer side wall portion 538 also includes an end surface portion 566 that is offset in an axial direction away from end 504 of the end member section. End surface portion 566 is oriented transverse to longitudinal axis AX and can be disposed in offset alignment with end surface portion 558 such that an inner peripheral edge surface portion (or inner peripheral side surface portion) 568 is formed peripherally-inward of outer peripheral edge surface portion 560. In some cases, an alignment or assembly structure can be included on or along end member section 500, such as may be suitable for positive engagement with a corresponding alignment or assembly structure of end member section 400. In the exemplary arrangement shown in FIGS. 4, 7 and 9-14, section wall 510 can, optionally, include a groove or recess 570 that extends axially inward into the section wall from along end surface portion 566. If included, groove or recess 570 can extend peripherally around end member section 500 spaced peripherally inward of inner peripheral edge surface portion 568 such that at least some of end surface portion 558 is disposed peripherally outward of groove or recess 570. In a preferred arrangement, groove or recess 570 is also spaced peripherally inward of projection wall portion 562 and in approximate alignment with projection wall portion 444 such that in an assembled condition projection wall portion 444 and groove 566 are axially coextensive.

In a preferred arrangement, section wall 510 of end member section 500 can be manufactured or otherwise formed within a cavity (not numbered) of an injection mold, such as is represented in FIG. 9 by dashed lines MDB. Additionally, it will be appreciated that section wall 510 can be molded from any suitable polymeric material or combination of polymeric materials, such as a fiber-reinforced polypropylene, a fiber-reinforced polyamide, or an unreinforced (i.e., relatively high-strength) thermoplastic (e.g., polyester, polyethylene, polyamide, polyether or any combination thereof), for example. In a preferred arrangement, section walls 406 and 510 can be formed from a common polymeric material.

As discussed above, end member section 600 of end member assembly EM1 is injection molded or otherwise formed from a polymeric material in situ with end member sections 400 and 500. End member section 600 includes a section wall 602 with an end surface portion 604 disposed in abutting engagement along end surface portion 436 and an end surface portion 606 disposed in abutting engagement along end surface portion 558. Additionally, section wall 604 also includes an inner peripheral surface portion 608 disposed in abutting engagement with inner peripheral edge surface portion 568 such that wall portions 610 and 612 are disposed peripherally-inward and coextensive with projection wall portions 444 and 562, respectively. Section wall 602 also includes an outer peripheral surface portion 614 that faces peripherally outward in a direction away from inner peripheral edge surface portion 568. In some cases, outer peripheral surface portion 614 can extend between and operatively connect outer peripheral edge surface portions 438 and 560. It will be appreciated, however, that other configurations and/or arrangements could alternately be used without departing from the subject matter of the present disclosure.

Figure 11:
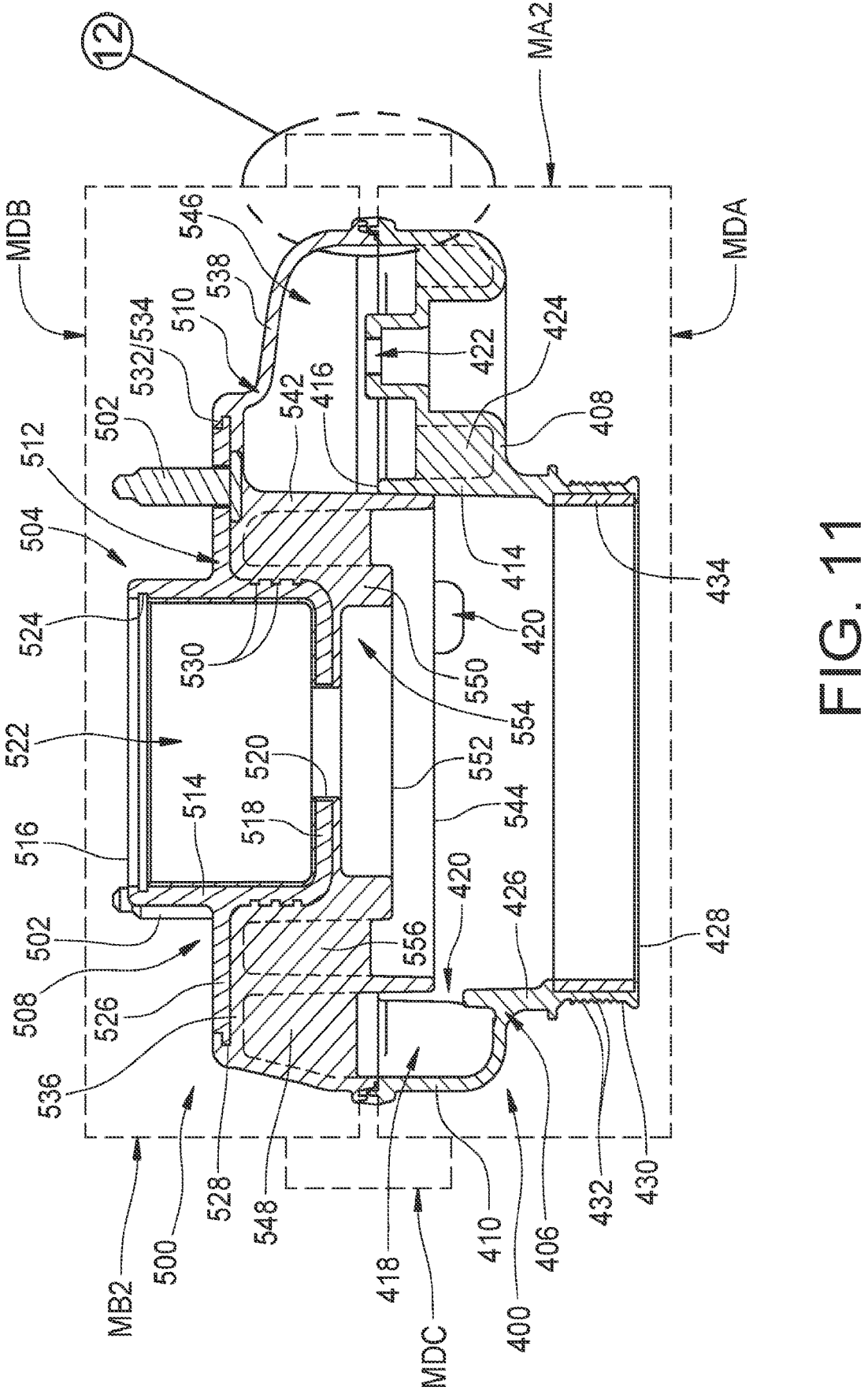
FIG. 11 is a cross-sectional side elevation view illustrating the two end member components of FIGS. 9 and 10 in situ with the respective individual mold sections and brought together for in situ manufacture of a third end member component.
Figure 12:
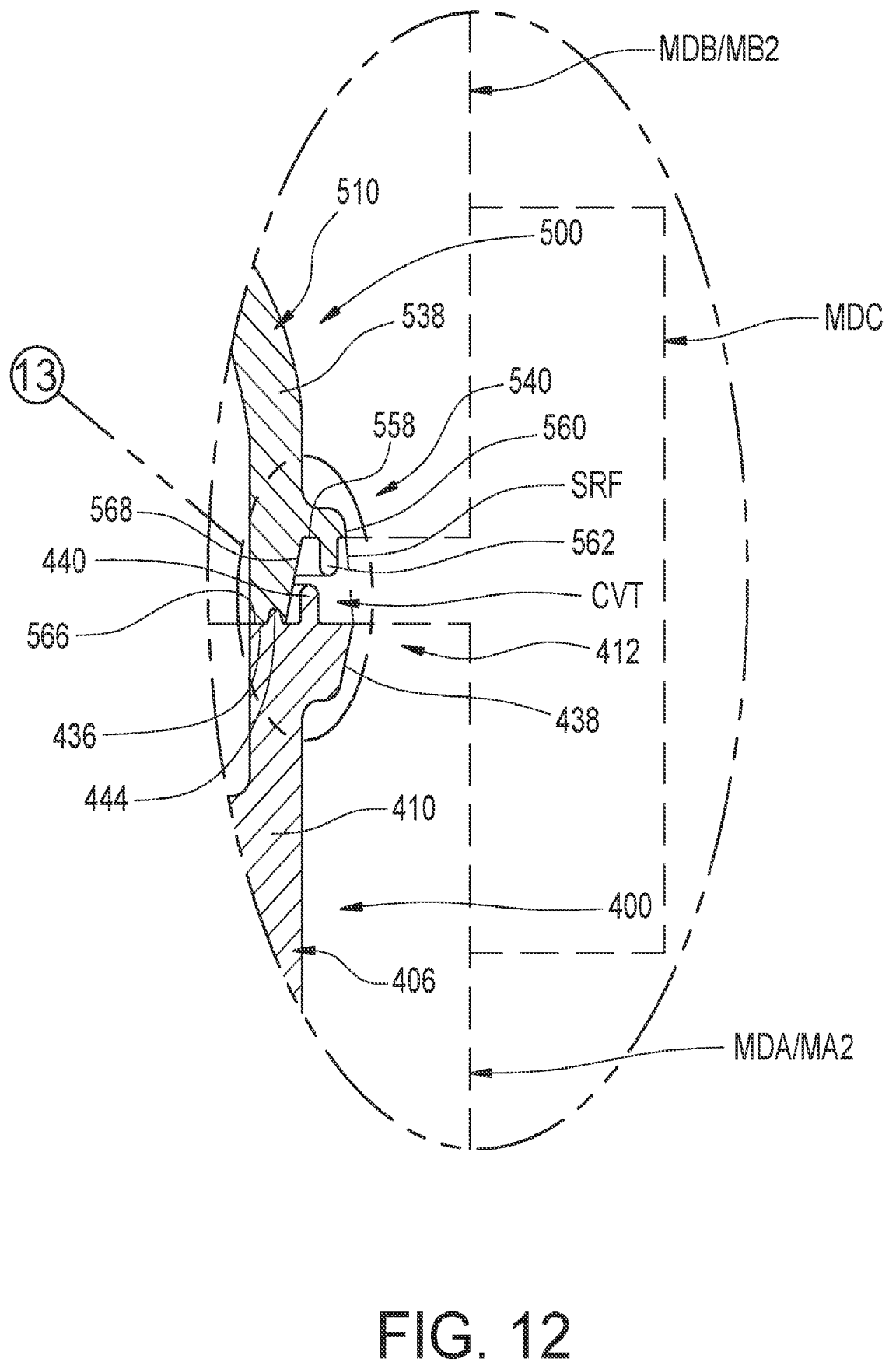
Figure 13:
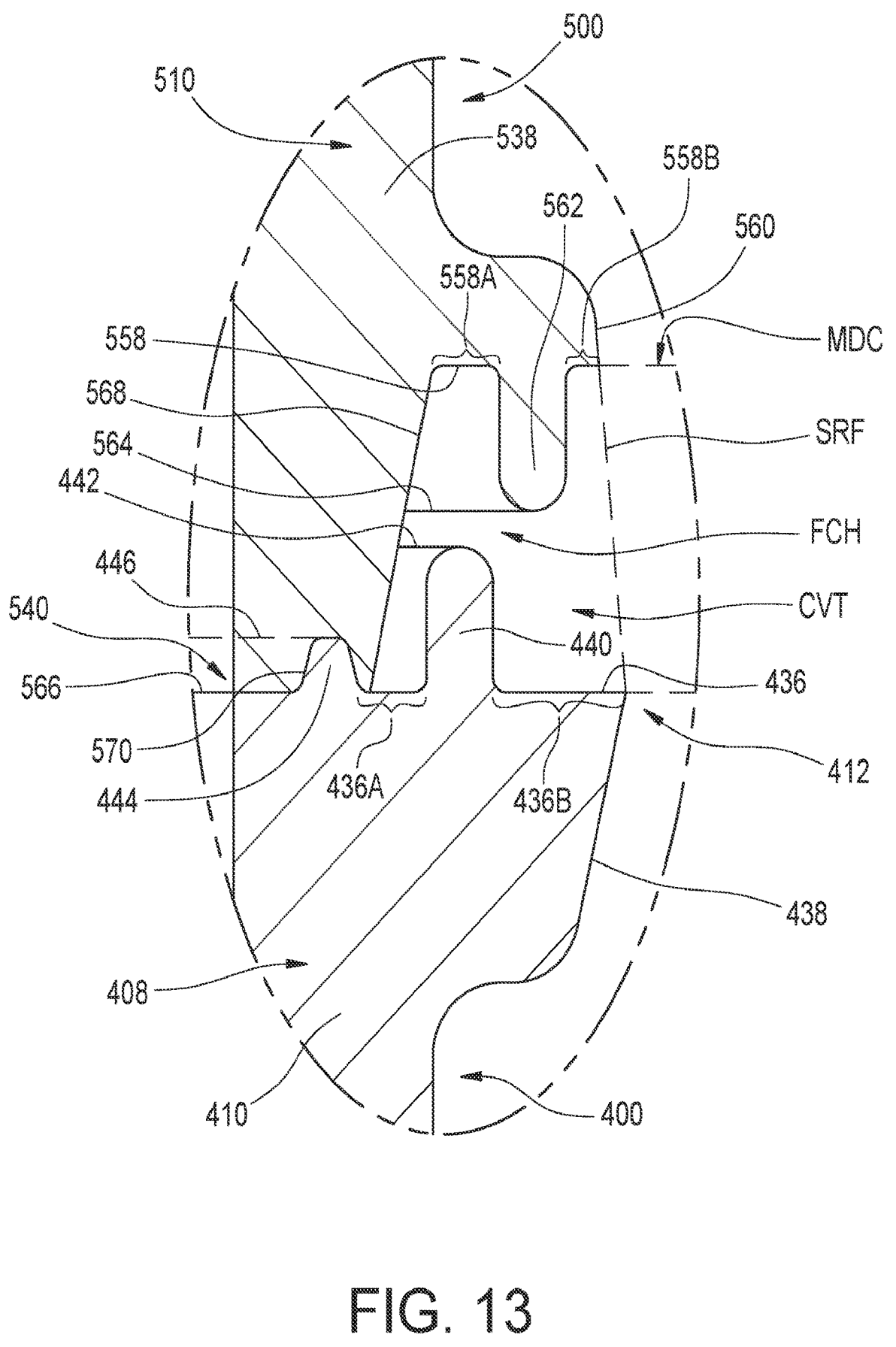

In a preferred arrangement, section wall 602 of end member section 600 can be manufactured or otherwise formed within a cavity (not numbered) that is at least partially defined by section wall 406 of end member section 400, section wall 510 of end member section 500 and a surface of an injection mold, such as is represented in FIGS. 11-13 by dashed lines MDC and mold surface SRF. Additionally, it will be appreciated that section wall 602 can be molded from any suitable polymeric material or combination of polymeric materials, such as a fiber-reinforced polypropylene, a fiber-reinforced polyamide, or an unreinforced (i.e., relatively high-strength) thermoplastic (e.g., polyester, polyethylene, polyamide, polyether or any combination thereof), for example. In a preferred arrangement, section wall 602 can be formed from a polymeric material common to section walls 406 and/or 510.

As discussed above, it will be appreciated that the section walls of end member sections 400, 500 and 600 can be molded from any suitable polymeric material or combination of polymeric materials. In some cases, each of section walls 406, 510 and 602 could be molded from a common, substantially-identical polymeric material. In other cases, each of section walls 406, 510 and 602 could be molded from a common polymeric material with one or more one of the section walls molded from a different grade of the otherwise common polymeric material. As a non-limiting example, section walls 406 and 510 could be molded from Nylon polymer with 40% glass fill and section wall 602 molded from the same Nylon polymer but with 10% glass fill. As another non-limiting example, section wall 406 could be molded from Nylon 6/6 with section walls 510 and 602 molded from Nylon 6. In still other cases, each of section walls 406, 510 and 602 could be molded from a different polymeric material and/or different grades of polymeric material. As a non-limiting example, section wall 406 could be molded from Nylon 6/6 with 40% glass fill, section wall 510 could be molded from unfilled Nylon 6, and section wall 602 could be molded from an acetal homopolymer or copolymer. As another non-limiting example, section wall 406 could be molded from Nylon 6/6 with 40% glass fill, section wall 510 could be molded from an ABS polymer, and section wall 602 could be molded from a TPE polymer. Accordingly, it is to be recognized and understood that any suitable combination of materials can be used without limitation to the foregoing examples.

Figure 10:
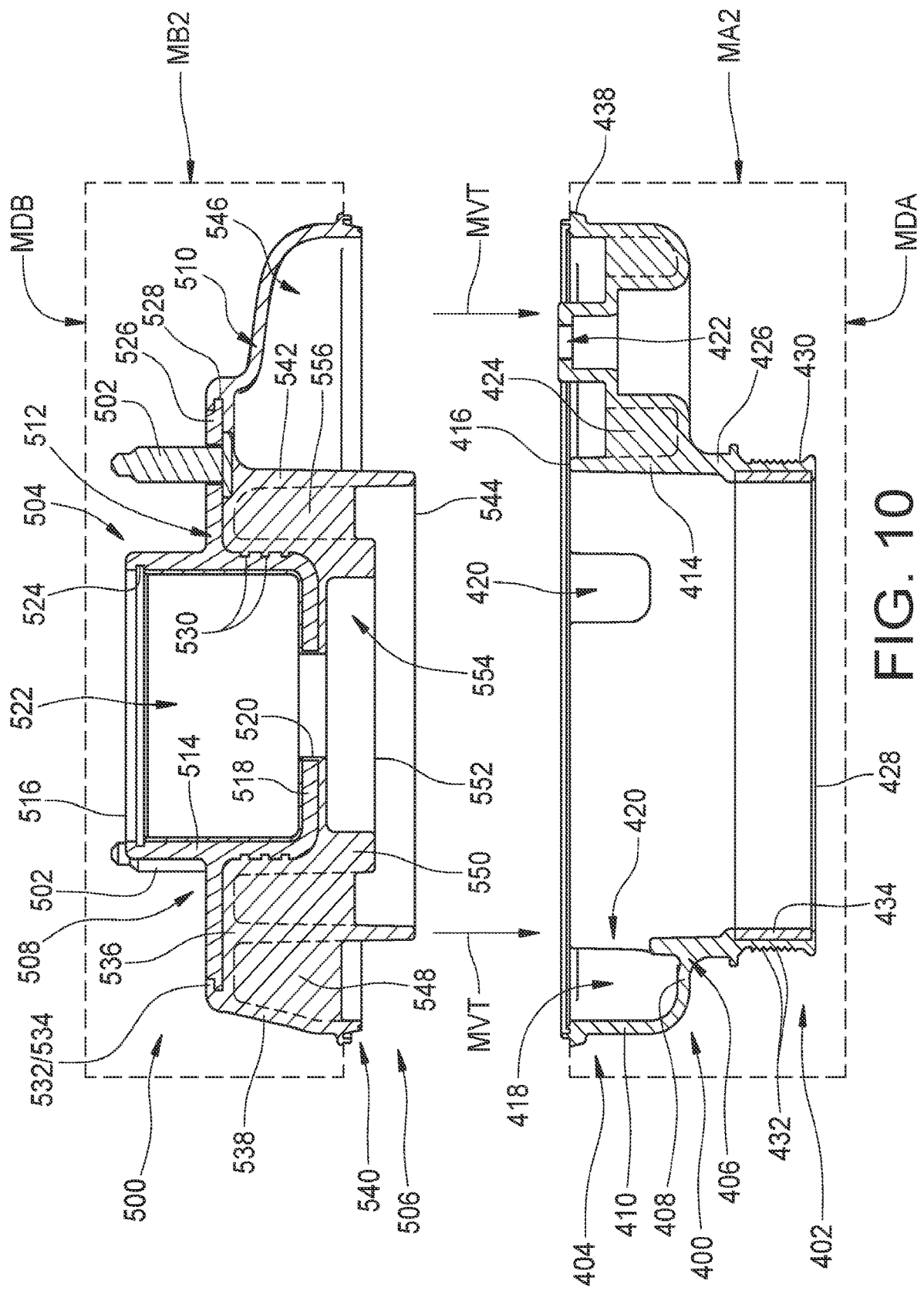
FIG. 10 is a cross-sectional side elevation view illustrating the two end member components of FIG. 9 in situ in respective individual mold sections with a section of each individual mold removed.

With reference, now, to FIGS. 9-14, one example of a method of manufacturing an end member assembly (e.g., end member assembly EM1) in accordance with the subject matter of the present disclosure is shown and described. As indicated above, FIG. 9 illustrates end member section 400 manufactured or otherwise formed in a cavity (not numbered) of injection mold MDA, which has mold sections MA1 and MA2. Additionally, FIG. 9 illustrates end member section 500 manufactured or otherwise formed in a cavity (not numbered) of injection mold MDB, which has mold sections MB1 and MB2. In FIG. 10, injection molds MDA and MDB are shown with mold sections MA1 and MB1, respectively, removed such that ends 404 and 506 of end member sections 400 and 500 are at least partially exposed. It will be appreciated that in such a condition, end member sections 400 and 500 are still at least partially disposed within and supported by the respective cavities of injection molds MDA and MDB. In this respect, handling or manual manipulation of individual end member sections is avoided during the manufacturing process.

FIG. 11 shows mold sections MA2 and MB2 of injection molds MDA and MDB, respectively, brought together, as is represented by arrows MVT in FIG. 10, such that end member sections 400 and 500 abuttingly engage one another to at least partially form a groove or cavity CVT extending peripherally about the end member sections. In some cases, end member sections 400 and 500 can be positioned in abutting engagement with one another such that projection wall portion 444 and groove or recess 570 are axially coextensive and abuttingly engage one another. Additionally, end member sections 400 and 500 can be positioned in abutting engagement with one another such that end surface portion 436 and end surface portion 566 of the end member sections abuttingly engage one another. In this manner, the abutting engagement of end member sections 400 and 500 can at least partially define a peripherally-inward extend of cavity CVT.

Figure 14:
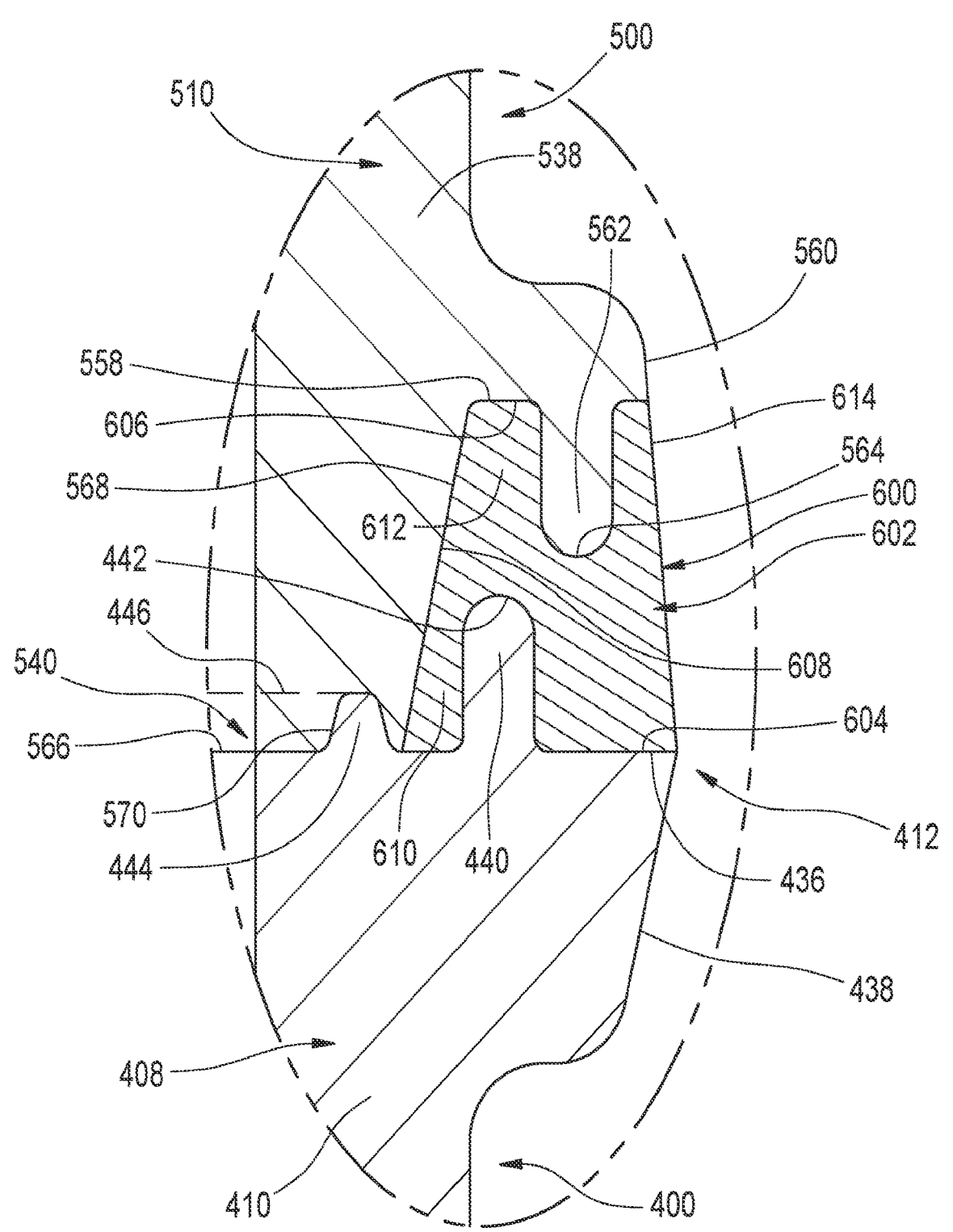
FIG. 14 is the enlarged view of a third end member component as manufactured in situ with the other two end member components.

Injection mold MDC can be introduced to injection molds MDA and/or MDB such that mold surface SRF at least partially defines cavity CVT together with at least end surface portion 436 of section wall 406, end surface portion 558 of section wall 510 and inner peripheral edge surface portion 568 of section wall 510. In some cases, distal edge 446 of projection wall portion 444 and distal edge 564 of projection wall portion 562 can be spaced axially apart from one another in an abutting condition of end member sections 400 and 500, such as is shown in FIGS. 12 and 13, for example. In such case, a flow channel FCH can be formed between distal edges 446 and 564, which may aid the flow of injection molded polymeric material to flow peripherally inward of the projection wall portions to form wall portions 610 and 612 of section wall 602. As shown in FIG. 14, upon injecting cavity CVT with polymeric material, end member section 600 secures end member sections 400 and 500 together and also forms a substantially fluid-tight connection between end member sections 400 and 500.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure. To aid the Patent Office and any readers of this application and any resulting patent in interpreting the claims appended hereto, Applicant does not intend any of the appended claims or any claim elements to invoke 35 U.S.C. 112(f) unless the words "means for" or "step for" are explicitly used in the particular claim.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A method of manufacturing a gas spring end member assembly, said method comprising:

injecting a first quantity of polymeric material into a first mold cavity at least partially defined by first and second first mold sections thereby molding a first end member section having a first section wall that includes a first outer peripheral wall portion;

injecting a second quantity of polymeric material into a second mold cavity at least partially defined by first and second second mold sections thereby molding a second end member section that is separate from said first end member section, said second end member section including a second section wall that includes a second outer peripheral wall portion;

separating said first first mold section from said second first mold section thereby exposing at least said first outer peripheral wall portion of said first section wall while said first end member section remains in situ in a portion of said first mold cavity of said second first mold section;

separating said first second mold section from said second second mold section thereby exposing at least said second outer peripheral wall portion of said second section wall while said second end member section remains in situ in a portion of said second mold cavity of said second second mold section;

introducing said first end member section in situ in said portion of said first mold cavity of said second first mold section to said second end member section in situ in said portion of said second mold cavity of said second second mold section thereby forming a groove extending peripherally around said first and second end member sections; and, injecting a third quantity of polymeric material in situ into said groove between said first and second end member sections thereby forming a third end member section operatively connecting said first and second end member sections such that a substantially fluid-tight joint is formed therebetween.

2. A method according to claim 1, wherein injecting said first quantity of polymeric material into said first mold cavity at least partially defined by said first and second first mold sections thereby molding said first end member section includes forming said first section wall with a first end surface portion that at least partially defines said groove.

3. A method according to claim 2, wherein injecting said first quantity of polymeric material into said first mold cavity at least partially defined by said first and second first mold sections thereby molding said first end member section includes forming said first outer peripheral wall portion with a first outermost peripheral edge such that said first end surface portion extends peripherally inward from along said first outermost peripheral edge.

4. A method according to claim 2, wherein injecting said first quantity of polymeric material into said first mold cavity at least partially defined by said first and second first mold sections thereby molding said first end member section includes forming said first section wall with a first annular projection extending axially from along said first end surface portion toward a first distal edge disposed within said groove.

5. A method according to claim 4, wherein injecting said third quantity of polymeric material in situ into said groove between said first and second end member sections thereby forming said third end member section includes forming at least a portion of said third end member section peripherally inward of said first annular projection such that at least said portion of said third end member section extends coextensively therewith.

6. A method according to claim 4, wherein injecting said third quantity of polymeric material in situ into said groove between said first and second end member sections thereby forming said third end member section includes forming at least a portion of said third end member section peripherally outward of said first annular projection such that at least said portion of said third end member section extends coextensively therewith.

7. A method according to claim 1, wherein injecting said second quantity of polymeric material into said second mold cavity at least partially defined by said first and second second mold sections thereby molding said second end member section includes forming said second section wall with a second end surface portion that at least partially defines said groove.

8. A method according to claim 7, wherein injecting said second quantity of polymeric material into said second mold cavity at least partially defined by said first and second second mold sections thereby molding said second end member section includes forming said second outer peripheral wall portion with a second outermost peripheral edge such that said second end surface portion extends peripherally inward from along said second outermost peripheral edge.

9. A method according to claim 7, wherein injecting said second quantity of polymeric material into said second mold cavity at least partially defined by said first and second second mold sections thereby molding said second end member section includes forming said second section wall with a second annular projection extending axially from along said second end surface portion toward a second distal edge disposed within said groove.

10. A method according to claim 9, wherein injecting said third quantity of polymeric material in situ into said groove between said first and second end member sections thereby forming said third end member section includes forming said at least a portion of said third end member section peripherally inward of said second annular projection such that at least said portion of said third end member section extends coextensively therewith.

11. A method according to claim 9, wherein injecting said third quantity of polymeric material in situ into said groove between said first and second end member sections thereby forming said third end member section includes forming at least a portion of said third end member section peripherally outward of said second annular projection such that at least said portion of said third end member section extends coextensively therewith.

12. A method according to claim 1, wherein injecting said first quantity of polymeric material into said first mold cavity at least partially defined by said first and second first mold sections thereby molding said first end member section includes forming said first section wall with a side surface portion extending around said first end member section along said first outer peripheral wall portion such that said side surface portion at least partially defines a peripherally-inward extent of said groove.

13. A method according to claim 1, wherein injecting said first quantity of polymeric material into said first mold cavity at least partially defined by said first and second first mold sections thereby molding said first end member section includes forming said first section wall with a first distal end surface portion, injecting said second quantity of polymeric material into said second mold cavity at least partially defined by said first and second second mold sections thereby molding said second end member section includes forming said second section wall with a second distal end surface portion, and introducing said first end member section in situ in said portion of said first mold cavity of said second first mold section to said second end member section in situ in said portion of said second mold cavity of said second second mold section includes orienting said second distal end surface portion in facing relation to said first distal end surface portion.

14. A method according to claim 13, wherein introducing said first end member section in situ in said portion of said first mold cavity of said second first mold section to said second end member section in situ in said portion of said second mold cavity of said second second mold section includes positioning said first and second distal end surface portions in abutting engagement with one another.

15. A method according to claim 14, wherein injecting said first quantity of polymeric material into said first mold cavity at least partially defined by said first and second first mold sections thereby molding said first end member section includes forming said first section wall with an alignment groove extending axially into said first outer peripheral wall portion from along said first distal end surface portion, and injecting said second quantity of polymeric material into said second mold cavity at least partially defined by said first and second second mold sections thereby molding said second end member section includes forming said second section wall with an alignment projection extending axially outward from along said second distal end surface, and introducing said first end member section in situ in said portion of said first mold cavity of said second first mold section to said second end member section in situ in said portion of said second mold cavity of said second second mold section includes orienting said second distal end surface portion such that said alignment projection is at least partially received within said alignment groove.

16. A method according to claim 1, wherein introducing said first end member section in situ in said portion of said first mold cavity of said second first mold section to said second end member section in situ in said portion of said second mold cavity of said second second mold section includes orienting said first and second end members sections such that an end member chamber is at least partially defined therebetween.

17. A method according to claim 1 further comprising:

providing a flexible spring member extending peripherally about a longitudinal axis and longitudinally between opposing first and second ends such that a spring chamber is at least partially defined therebetween;

securing an end member across said first end of said flexible spring member; and, securing said gas spring end member assembly across said second end of said flexible spring member such that a substantially fluid-tight connection is formed therebetween.

18. A method according to claim 17, wherein introducing said first end member section in situ in said portion of said first mold cavity of said second first mold section to said second end member section in situ in said portion of said second mold cavity of said second second mold section includes orienting said first and second end member sections together such that an end member chamber is at least partially defined therebetween, and securing said gas spring end member assembly across said second end of said flexible spring member includes connecting said end member chamber in fluid communication with said spring chamber.

19. A method according to claim 1 further comprising providing at least one third mold section, and operatively engaging said at least one third mold section with one or more of said first first mold section, said second first mold section, said first second mold section and/or said second second mold section to at least partially define a third mold cavity within said groove prior to injecting said third quantity of polymeric material into said third mold cavity.

* * * * *